(12) United States Patent
Bunk (10) Patent No.: US 9,789,860 B2
(45) Date of Patent: Oct. 17, 2017

(54) METHOD FOR DETERMINING A LIKELY INTERNAL PRESSURE FOR A MASTER BRAKE CYLINDER AND DEVICE FOR DETERMINING A LIKELY INTERNAL PRESSURE FOR A MASTER BRAKE CYLINDER

(71) Applicant: Robert Bosch GmbH, Stuttgart (DE)

(72) Inventor: Michael Bunk, Leingarten (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/900,930

(22) PCT Filed: Jun. 12, 2014

(86) PCT No.: PCT/EP2014/062184
§ 371 (c)(1),
(2) Date: Dec. 22, 2015

(87) PCT Pub. No.: WO2014/206740
PCT Pub. Date: Dec. 31, 2014

(65) Prior Publication Data
US 2016/0137175 A1 May 19, 2016

(30) Foreign Application Priority Data

Jun. 26, 2013 (DE) .......................... 10 2013 212 322

(51) Int. Cl.
*B60T 7/12* (2006.01)
*G05D 1/00* (2006.01)
(Continued)

(52) U.S. Cl.
CPC .......... *B60T 8/17551* (2013.01); *B60T 7/042* (2013.01); *B60T 8/172* (2013.01); *B60T 8/175* (2013.01);
(Continued)

(58) Field of Classification Search
CPC .... B60T 13/686; B60T 13/146; B60T 8/4081; B60T 13/745; B60T 13/741;
(Continued)

(56) References Cited

U.S. PATENT DOCUMENTS 4,560,210 A * 12/1985 Tani ...................... B60T 8/1766
188/195
4,565,067 A * 1/1986 Tani ...................... B60T 8/1766
303/22.8
(Continued)

FOREIGN PATENT DOCUMENTS

CN 1972831 A 5/2007
CN 102753412 A 10/2012
(Continued)

*Primary Examiner* — Jelani Smith
*Assistant Examiner* — Luis A Martinez Borrero
(74) *Attorney, Agent, or Firm* — Norton Rose Fulbright US LLP; Gerard Messina (57) ABSTRACT

A method for determining a likely internal pressure for a master brake cylinder including: estimating/measuring a displacement path(s) of a brake input element configured on a master cylinder from initial position thereof; estimating/measuring a first hydraulic fluid volumetric flow rate of a hydraulic fluid of the braking system out of or into a first pressure chamber of the master cylinder, and of a second hydraulic fluid volumetric flow rate of the hydraulic fluid out of or into a second pressure chamber of the master cylinder; and determining the likely internal pressure for a master cylinder considering the estimated/measured displacement path(s), the estimated and/or measured first hydraulic fluid volumetric flow rate, and the estimated and/or measured second hydraulic fluid volumetric flow rate. Also described is a device for determining a likely internal pressure for a master brake cylinder, and an electromechanical brake booster, ESP control, and vehicle braking system.

13 Claims, 7 Drawing Sheets

(51) Int. Cl.

| | |
|---|---|
| *G06F 7/00* | (2006.01) |
| *G06F 17/00* | (2006.01) |
| *B60T 8/1755* | (2006.01) |
| *B60T 8/172* | (2006.01) |
| *B60T 8/48* | (2006.01) |
| *B60T 7/04* | (2006.01) |
| *B60T 13/14* | (2006.01) |
| *B60T 13/66* | (2006.01) |
| *B60T 13/68* | (2006.01) |
| *B60T 8/175* | (2006.01) |
| *B60T 8/38* | (2006.01) |
| *B60T 8/42* | (2006.01) |

(52) U.S. Cl.
CPC .......... *B60T 8/4872* (2013.01); *B60T 13/146* (2013.01); *B60T 13/662* (2013.01); *B60T 13/686* (2013.01); *B60T 8/38* (2013.01); *B60T 8/4291* (2013.01); *B60T 2270/86* (2013.01)

(58) Field of Classification Search
CPC ...... B60T 2270/604; B60T 17/22; B60T 1/10; B60T 2270/82; B60T 11/224; B60T 8/4077; B60T 2270/406; B60T 8/1755; B60T 11/236
USPC ........ 701/70, 22, 41, 78, 71, 74, 80, 83, 84, 701/93, 102, 104, 111
See application file for complete search history.

(56) References Cited

U.S. PATENT DOCUMENTS

| | | | | |
|---|---|---|---|---|
| 4,893,691 | A * | 1/1990 | Park ....................... | B60T 13/72 180/169 |
| 6,450,591 | B1 * | 9/2002 | Kawahata ............. | B60T 8/3655 303/122.05 |
| 8,167,383 | B2 * | 5/2012 | Nishino .................. | B60T 7/042 188/355 |
| 2003/0062228 | A1 * | 4/2003 | Ichinose ................. | B60T 7/042 188/72.3 |
| 2008/0120004 | A1 * | 5/2008 | Nakada ................. | B60T 8/3655 701/70 |
| 2009/0001807 | A1 * | 1/2009 | Nomura .................... | B60T 8/36 303/20 |
| 2009/0039702 | A1 * | 2/2009 | Nishino .................. | B60T 7/042 303/114.1 |
| 2010/0089709 | A1 | 4/2010 | Shimada et al. | |
| 2010/0301667 | A1 * | 12/2010 | Yamamoto ............ | B60T 8/4081 303/5 |
| 2014/0244127 | A1 * | 8/2014 | Strengert ................. | B60T 1/10 701/70 |
| 2016/0046272 | A1 * | 2/2016 | Masur .................. | B60T 13/662 303/15 |
| 2016/0096434 | A1 * | 4/2016 | Nakaoka ................ | B60L 3/102 701/78 |

FOREIGN PATENT DOCUMENTS

| | | |
|---|---|---|
| DE | 197 23 255 | 12/1997 |
| DE | 10 2011 080431 | 2/2013 |
| JP | 2007 083814 | 4/2007 |
| JP | 2008280028 A | 11/2008 |

* cited by examiner

METHOD FOR DETERMINING A LIKELY INTERNAL PRESSURE FOR A MASTER BRAKE CYLINDER AND DEVICE FOR DETERMINING A LIKELY INTERNAL PRESSURE FOR A MASTER BRAKE CYLINDER

FIELD OF THE INVENTION

The present invention relates to a method for determining a likely internal pressure for a master brake cylinder. The present invention also relates to a device for determining a likely internal pressure for a master brake cylinder. In addition, the present invention relates to an electromechanical brake booster, an ESP control, and a braking system for a vehicle.

BACKGROUND INFORMATION

The German Patent Application DE 10 2011 080 431 A1 discusses a braking system for a vehicle. The braking system includes at least one admission pressure sensor that is adapted for determining a pressure prevailing in the master brake cylinder.

Figure 1A:
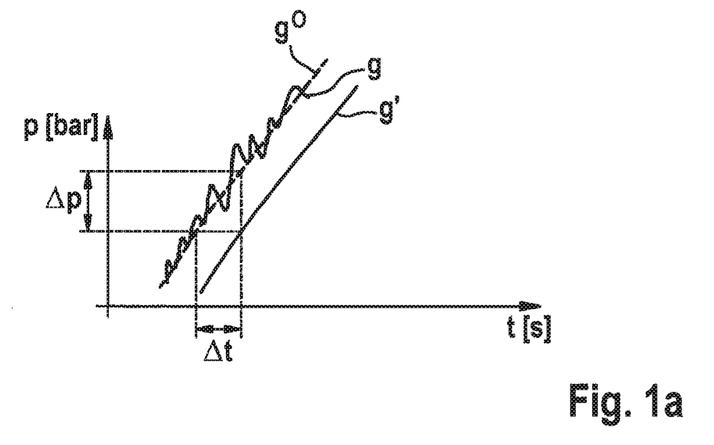
FIGS. 1a and 1b show coordinate systems for clarifying deviations between commonly measured admission pressure values, sensor values processed in accordance with the related art, and pressure values prevailing in a master brake cylinder.
Figure 1B:
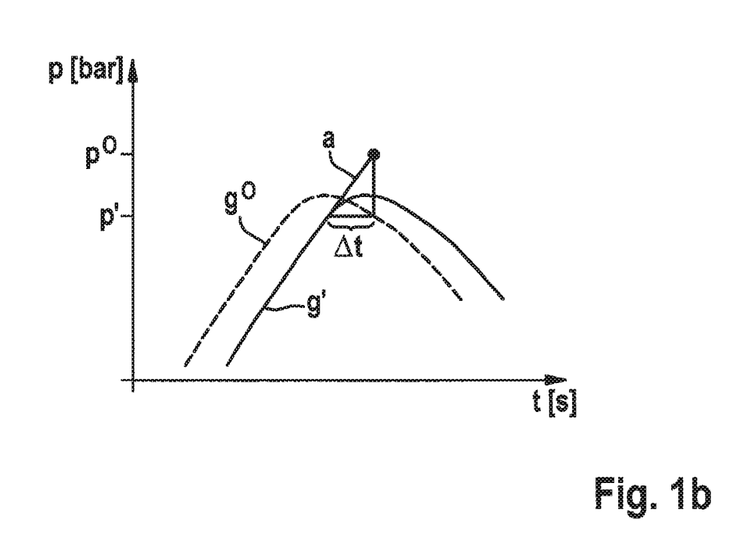

FIGS. 1a and 1b show coordinate systems for clarifying deviations between commonly measured admission pressure values, sensor values processed in accordance with the related art, and pressure values prevailing in a master brake cylinder. The abscissas of the coordinate systems of FIGS. 1a and 1b are the time axis t (in seconds), while the ordinates of the coordinate systems of FIGS. 1a and 1b indicate a pressure (in bar).

A graph g in FIG. 1a shows commonly measured admission pressure values, while a graph g0 in FIG. 1a indicates the (real) pressure values/real admission pressure values prevailing in the master brake cylinder. Graph g reveals that a signal noise typically occurs. The signal noise can be eliminated by a sensor signal conditioning, whereby a graph g', which includes sensor values processed in accordance with the related art, can be derived from graph g. A suitable sensor signal conditioning lasts, however, for at least a signal conditioning time $\Delta t$. However, during signal conditioning time $\Delta t$, the pressure/real admission pressure prevailing in the master brake cylinder can change by a pressure difference $\Delta p$.

FIG. 1b shows an attempt to use an extrapolation in accordance with the equation (Equation 0)

$$p^0 = p' + a \cdot \Delta t, \quad \text{(Equation 0)}$$

to estimate a likely admission pressure $p^0$ on the basis of processed sensor values p' of graph g' and a slope a of processed sensor values of graph p'.

SUMMARY OF THE INVENTION

The present invention provides a method for determining a likely internal pressure for a master brake cylinder having the features described herein, a device for determining a likely internal pressure for a master brake cylinder having the features described herein, an electromechanical brake booster having the features described herein, an ESP control having the features of Claim 12, and a braking system for a vehicle having the features described herein.

The likely internal pressure for a master brake cylinder may generally be understood to refer to a likely admission pressure as well. The concept "likely internal pressure for a master brake cylinder" is merely used in the following for the sake of clarity.

The device for determining a likely internal pressure for a master brake cylinder may, for example, be a sensor device, an evaluation device, and/or an estimation device. The device for determining a likely internal pressure for a master brake cylinder may also be a control device for at least one braking system component. As explained in greater detail below, the device for determining a likely internal pressure for a master brake cylinder may also be configured, in particular, at least as a part of a control electronics of an electromechanical brake booster, and/or at least as a part of a control electronics of an electromechanical brake booster, and/or at least as a part of an ESP control.

SUMMARY OF THE INVENTION

The present invention makes it possible for the likely internal pressure for a master brake cylinder to be determined/defined more rapidly and/or more reliably. In the case of the likely internal pressure for a master brake cylinder defined in accordance with the present invention, there is no need to fear inaccuracies attributable to a signal noise. Thus, in accordance with the present invention, the conventional need for conditioning a sensor signal when determining the likely internal pressure for a master brake cylinder is also eliminated. Therefore, the device for determining the likely internal pressure for a master brake cylinder also does not require any costly evaluation electronics for executing the sensor signal conditioning. For that reason, the device according to the present invention may have a relatively simple design. Accordingly, the corresponding method for determining a likely internal pressure for a master brake cylinder may also be realized using less expensive components that require less installation space.

Moreover, the present invention eliminates the problems of a delayed determination commonly encountered because of the signal conditioning time required for the sensor signal conditioning. It is thus possible to eliminate an extrapolation/time delay compensation, as in the related art, that often does not contribute to improving signal quality. While the conventional extrapolation so is not able to react to frequent fluctuations in the admission pressure, due, for example, to return flows, here as well, the subject matters of the present invention make it possible for the likely internal pressure for a master brake cylinder to be reliably determined/defined. The present invention provides, in particular, a model-based determination of the likely internal pressure for a master brake cylinder, respectively a model-based estimation of a pressure gradient in the master brake cylinder, which, even in the case of a pressure profile in the master brake cylinder having a time-variant slope, yields reliable results having an improved accuracy.

In particular, the present invention may be executed so quickly that there is hardly any risk of the determined, likely internal pressure for a master brake cylinder following/lagging behind the actual admission pressure. Therefore, this overcomes the disadvantage of measured admission pressure values that in one phase of a braking maneuver, in which the driver re-releases the brake pedal, are always greater, for example, than the actually prevailing admission pressure.

The likely internal pressure for a master brake cylinder determined in accordance with the present invention may subsequently be used for controlling at least one braking system component. For example, an ESP control of a braking system operated by the present invention may use the determined, likely internal pressure for a master brake cylinder for controlling at least one hydraulic component of the braking system, such as, in particular, for controlling the wheel inlet valves. This is especially advantageous when a setpoint of the at least one hydraulic component of the braking system is optimizable to the likely internal pressure for a master brake cylinder. The determined, likely internal pressure for a master brake cylinder may be utilized by the ESP control, in particular for a propagation delay compensation/time delay compensation. In the same way, a control of an electromechanical brake booster of the braking system may advantageously use the likely internal pressure for a master brake cylinder to selectively precontrol the electromechanical brake booster. Since the likely internal pressure for a master brake cylinder may be determined quickly and reliably by the present invention, at least the method of functioning of the ESP control and/or of the electromechanical brake booster of the braking system may itself be adapted to pronounced pressure fluctuations in the master brake cylinder.

In particular, the method of functioning of the ESP control and/or of the electromechanical brake booster of the braking system may be optimized to allow pressure fluctuations in the master brake cylinder to be attenuated/prevented. This protects braking system components from an increased mechanical load (triggered by pronounced pressure fluctuations in the master brake cylinder). This makes it possible to improve the service life and the performance reliability of the braking system components.

One advantageous specific embodiment of the method provides that the likely internal pressure for a master brake cylinder $p_{Mc}(t)$ be determined while additionally taking into account at least one measured master brake cylinder pressure value and/or at least one measured admission pressure. Thus, the present invention is also suited for the improved processing of measured values.

Likely internal pressure $p_{Mc}(t)$ for a master brake cylinder is advantageously determined while additionally taking into account a compression module K of the hydraulic fluid, an output volume $V_0$ of the master brake cylinder if brake input element is in the initial position thereof, and an inner diameter d of the master brake cylinder and/or a cross-sectional area A of the master brake cylinder. Using such a model based on the geometry of the master brake cylinder, the likely internal pressure for a master brake cylinder may be defined/determined with enhanced accuracy.

In another advantageous specific embodiment, to determine likely internal pressure $p_{MC}(t)$ for a master brake cylinder, a rate of pressure change $dp_{MC}/dt$ is continuously determined where:

$$\frac{dp_{MC}}{dt} = \frac{K}{V_0 - \pi \cdot \frac{d^2}{4} \cdot s} \cdot \left(q_{MC1} + q_{MC2} + \pi \cdot \frac{d^2}{4} \cdot \frac{ds}{dt}\right),$$

ds/dt being an estimated or measured rate of change of displacement path s of brake input element and/or an estimated or measured adjustment speed of the brake input element. The rate of pressure change may be subsequently further analyzed to determine the likely internal pressure for a master brake cylinder. Moreover, the rate of pressure change may also be taken into account when controlling the braking system components.

Alternatively, to determine the likely internal pressure $p_{MC}(t)$ for a master brake cylinder, rate of pressure change $dp_{MC}/dt$ may be continuously determined where:

$$\frac{dp_{MC}}{dt} = \frac{K}{V_0 - A \cdot s} \cdot \left(q_{MC1} + q_{MC2} + A \cdot \frac{ds}{dt}\right),$$

ds/dt being the estimated or measured rate of change of displacement path s of brake input element and/or the estimated or measured adjustment speed of the brake input element. This procedure as well also ensures the above mentioned advantages.

Likely internal pressure $p_{MC}(t)$ for a master brake cylinder may be determined as the integral over rate of pressure change $dp_{MC}/dt$ where:

$$p_{MC}(t) = p_{MC}(t_0) + \int_{t_0}^{t} \frac{dp_{MC}}{dt} \cdot dt,$$

$p_{MC}(t_0)$ being an output value or a value ascertained for point in time t0. Thus, the likely internal pressure for a master brake cylinder may be determined relatively accurately.

Likely internal pressure $p_{MC}(t)$ for a master brake cylinder may likewise be determined over rate of pressure change $dp_{MC}/dt$ where:

$$p_{MC}(t) = p_{MC}*(t') + \frac{dp_{MC}}{dt} \cdot (t - t'),$$

$p_{MC}*(t')$ being a master brake cylinder pressure value measured at time t', an admission pressure measured at time t', or a likely internal pressure pMc(t') for a master brake cylinder determined for time t'. Thus, a compensation for the signal propagation time may also be realized. To further enhance accuracy, it would also be possible to adapt the relevant propagation time parameters using a control loop or a different learning algorithm.

Displacement path s may be measured and/or estimated using at least one subunit of an electromechanical brake booster. This multifunctionality of the electromechanical brake booster generally equipped with a suitable sensor eliminates the need for further sensors for equipping the braking system.

In another specific embodiment, at least one subunit of an ESP control electronics measures and/or estimates first hydraulic fluid volumetric flow rate $q_{MC1}$ and/or second hydraulic fluid volumetric flow rate $q_{MC2}$. The ESP control electronics also already typically has data/sensors for estimating/measuring the hydraulic fluid volumetric flow rates. Thus, there is no need here for equipping the braking system with further sensors suited for that purpose.

The advantages enumerated above may also be realized by a suitable device for determining a likely internal pressure for a master brake cylinder. The device may be further refined in accordance with the specific embodiments of the method.

The advantages are also realized by an electromechanical brake booster having a device of this kind. By equipping the electromechanical brake booster with the device, respectively integrating the device in a control electronics of the electromechanical brake booster, the further advantage is derived that no time delay occurs between a determination of the likely internal pressure for a master brake cylinder and the taking into account thereof by the control electronics, since there is no need for a signal transmission.

The advantages are equally ensured by equipping an ESP control with a suitable device. Even when the device is integrated in the ESP control, the need is eliminated for a signal transmission before the ESP control takes into account the likely internal pressure for a master brake cylinder.

Moreover, the advantages are also realized by a braking system for a motor vehicle having the device, the electromechanical brake booster and/or the ESP control.

The present invention is described in the following on the basis of specific embodiments in conjunction with the figures.

DETAILED DESCRIPTION

Figure 2A:
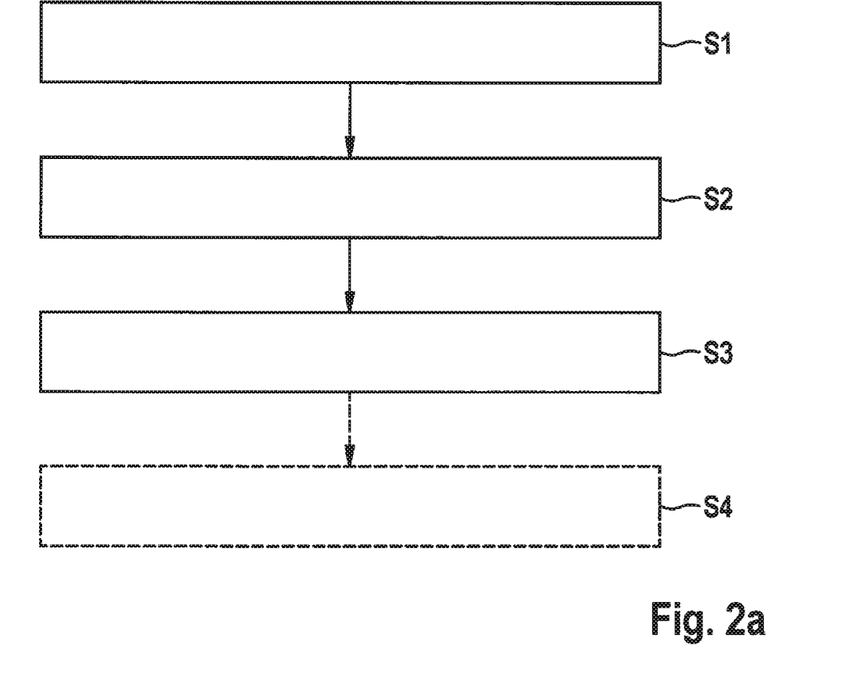
FIGS. 2a and 2b show a flow chart and a schematic representation of a master brake cylinder of a braking system for clarifying a first specific embodiment of the method for determining a likely internal pressure for a master brake cylinder.
Figure 2B:
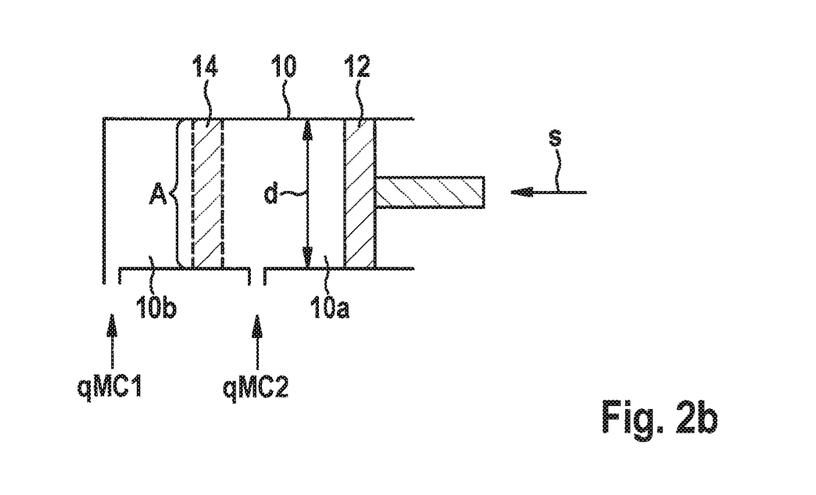

FIGS. 2a and 2b show a flow chart and a schematic representation of a master brake cylinder of a braking system for illustrating a first specific embodiment of the method for determining a likely internal pressure for a master brake cylinder.

In a method step S1, a displacement path s of a brake input element (not shown) configured on master brake cylinder 10 is measured or estimated from the initial position thereof. The brake input element may be understood, in particular, to be a brake pedal, an input rod or an output rod. Displacement path s may be, for example, an actuating travel of the brake pedal or a rod travel. Displacement path s may be that of an input rod. It is noted, however, that at least one other variable, other than displacement path s, that represents an adjustment of a brake input element, may also be measured or estimated.

To measure displacement path s, for example, a rod displacement sensor and/or a differential displacement sensor may be used. In the same way, displacement path s may be estimated taking into account an actuation path of the brake pedal, a driver's braking force and/or a driver's braking pressure. Displacement path s may be measured and/or estimated using at least one subunit of an electromechanical brake booster. For example, a sensor integrated in the electromechanical brake booster may be used for measuring displacement path a of the input rod of the electromechanical brake booster. In the same way, a control of the electromechanical brake booster may be used for estimating displacement path s. This multifunctionality of the at least one subunit of an electromechanical brake booster makes it possible to economize on additional electronics for measuring and/or estimating displacement path s. Moreover, there is no need here for a time-consuming signal/data transmission to the control of the electromechanical brake booster for the later transmission of the measured and/or estimated displacement path s, respectively of a likely internal pressure for a master brake cylinder that takes displacement path s into account.

In a method step S2, a first hydraulic fluid volumetric flow rate $q_{MC1}$ of a hydraulic fluid of the braking system out of or into a first pressure chamber 10a of master brake cylinder 10 is measured and/or estimated. Similarly, in method step S2, a second hydraulic fluid volumetric flow rate $q_{MC2}$ of the hydraulic fluid out of or into a second pressure chamber 10b of master brake cylinder 10 is measured and/or estimated. First pressure chamber 10a may be bounded, for example, by a rod piston 12 of master brake cylinder 10, while second pressure chamber 10 is bounded by a floating piston 14 of master brake cylinder 10.

To execute method step S2, first hydraulic fluid volumetric flow rate $q_{MC1}$ and/or second hydraulic fluid volumetric flow rate $q_{MC2}$ are measured and/or estimated by at least one subunit of an ESP control electronics. Already generally provided in an ESP control electronics are continually updated data on the hydraulic fluid volumetric flow rates $q_{MC1}$ and $q_{MC2}$. Also, because of the multifunctionality of the ESP control electronics, one may also economize on additional electronics for measuring and/or estimating hydraulic fluid volumetric flow rates $q_{MC1}$ and $q_{MC2}$. As explained in greater detail below, the need is eliminated here for a time-consuming signal/data transmission to the ESP control electronics.

Method steps S1 and S2 may be executed in any desired sequence or also simultaneously. Thus, the numbering does not stipulate any time sequence for executing method steps S1 and S2.

In a subsequent method step S3, likely internal pressure $p_{MC}(t)$ for a master brake cylinder is determined at least taking into account estimated and/or measured displacement path s, estimated and/or measured first hydraulic fluid volumetric flow rate $q_{MC1}$, and estimated and/or measured second hydraulic fluid volumetric flow rate $q_{MC2}$. This type of determination of likely internal pressure $p_{MC}(t)$ for a master brake cylinder may be executed more quickly than the above mentioned measurement of admission pressure values and a sensor signal conditioning generally necessary subsequently thereto. Thus, likely internal pressure $p_{MC}(t)$ for a master brake cylinder, determined using method step S3, is usually more accurate than the value obtained from the measured admission pressure values and the subsequent sensor signal conditioning. Therefore, the internal pressure for a master brake cylinder actively prevailing in master brake cylinder 10 may be defined/estimated more accurately. Moreover, the faster determination of likely internal pressure $p_{MC}(t)$ for a master brake cylinder realized by method step S3 also makes it possible to react more quickly to changes in the currently prevailing internal pressure for a master brake cylinder.

An advantageous specific embodiment of the method provides that likely internal pressure $p_{MC}(t)$ for a master brake cylinder be able to be determined while additionally taking into account a compression module K of the hydraulic fluid, an output volume $V_0$ of the master brake cylinder 10 if brake input element is in the initial position thereof, and an inner diameter d of master brake cylinder 10, and/or a cross-sectional area A of master brake cylinder 10. To determine the likely internal pressure $p_{MC}(t)$ for a master brake cylinder, rate of pressure change $dp_{MC}/dt$ may be continuously determined in accordance with the equation (Equation 1) where:

$$\frac{dp_{MC}}{dt} = \frac{K}{V_0 - \pi \cdot \frac{d^2}{4} \cdot s} \cdot \left( q_{MC1} + q_{MC2} + \pi \cdot \frac{d^2}{4} \cdot \frac{ds}{dt} \right), \quad \text{(Equation 1)}$$

ds/dt being an estimated or measured rate of change of displacement path s of brake input element and/or an estimated or measured adjustment speed of the brake input element.

However, if master brake cylinder 10 does not have any cylindrical internal volume, cross-sectional area A of master brake cylinder 10 may also be used orthogonally to an adjustment direction of at least one piston 12 and 14 thereof in order to continuously determine rate of pressure change $dp_{MC}/dt$, as expressed by the equation (Equation 2):

$$\frac{dp_{MC}}{dt} = \frac{K}{V_0 - A \cdot s} \cdot \left( q_{MC1} + q_{MC2} + A \cdot \frac{ds}{dt} \right), \quad \text{(Equation 2)}$$

ds/dt being the estimated or measured rate of change of displacement path s of brake input element and/or the estimated or measured adjustment speed of the brake input element.

In both cases, likely internal pressure $p_{MC}(t)$ for a master brake cylinder is determined as the integral over rate of pressure change $dp_{MC}/dt$ in accordance with the equation (Equation 3) where:

$$p_{MC}(t) = p_{MC}(t_0) + \int_{t_0}^{t} \frac{dp_{MC}}{dt} \cdot dt, \quad \text{(Equation 3)}$$

$P_{MC}(to)$ being an output value or a value ascertained for point in time t0.

In the same way, likely internal pressure $p_{MC}(t)$ for a master brake cylinder may be determined as a function of rate of pressure change $dp_{MC}/dt$ determined by the equation (Equation 1) or (Equation 2), in accordance with (Equation 4):

$$p_{MC}(t) = p_{MC} * (t') + \frac{dp_{MC}}{dt} \cdot (t - t'), \quad \text{(Equation 4)}$$

$p_{MC}*(t')$ being a master brake cylinder pressure value measured at time t', an admission pressure measured at time t', or a likely internal pressure $p_{MC}(t')$ for a master brake cylinder determined for time t'. In other cases as well, the likely internal pressure $p_{MC}(t)$ for a master brake cylinder is determined while additionally taking into account at least one measured master brake cylinder pressure value and/or at least one measured admission pressure. Thus, there are many ways for adjusting likely internal pressure $p_{MC}(t)$ for a master brake cylinder using measured sensor values.

In one optional method step S4, likely internal pressure $p_{MC}(t)$ for a master brake cylinder is taken into account during the control of at least one braking system component. For example, likely internal pressure $P_{MC}(t)$ for a master brake cylinder may be utilized during a control of at least one hydraulic component, in particular of the wheel inlet valves. At least one setpoint of the at least one hydraulic component may be determined taking into account likely internal pressure $p_{MC}(t)$ for a master brake cylinder. Likely internal pressure $p_{MC}(t)$ for a master brake cylinder may be especially used for a propagation delay compensation/time delay compensation. In the same way, likely internal pressure $p_{MC}(t)$ for a master brake cylinder may also be used for selectively precontrolling an electromechanical brake booster, as is clarified in greater detail below.

Figure 3A:
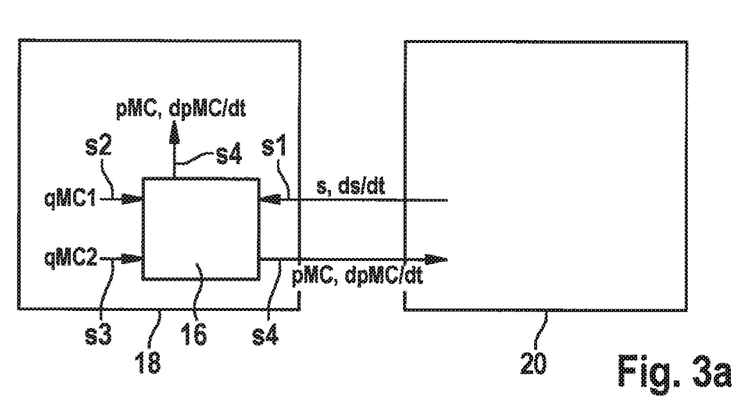
FIG. 3a through 3c show schematic representations of a first, second and third specific embodiment of the device for determining a likely internal pressure for a master brake cylinder.
Figure 3B:
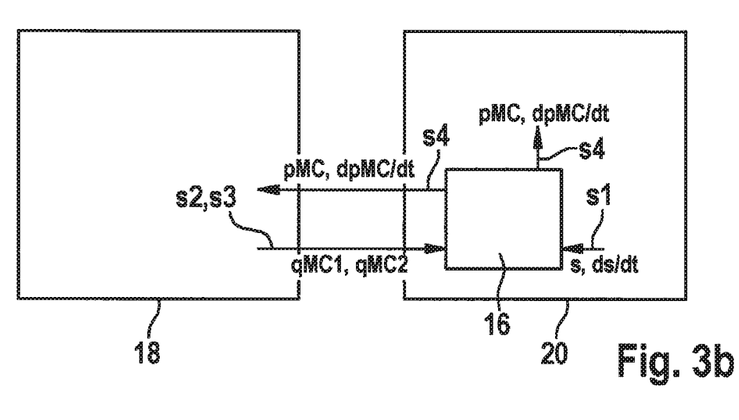
Figure 3C:
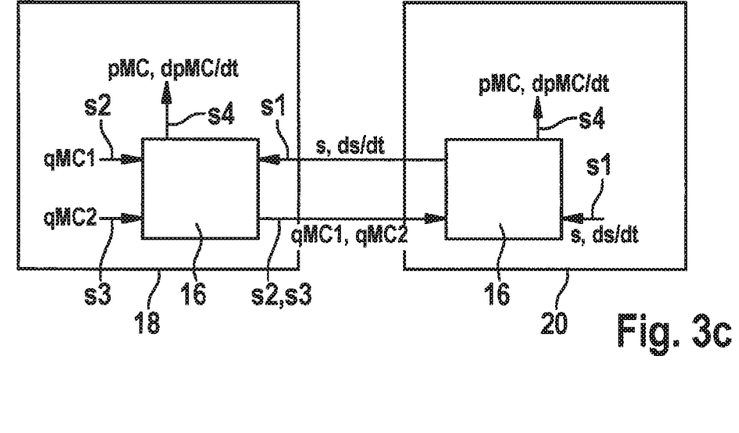

FIG. 3a through 3c show schematic representations of a first, second and third specific embodiment of the device for determining a likely internal pressure for a master brake cylinder.

Device 16 schematically shown in each of FIG. 3a through 3c has an electronic device (not shown) that is configured for determining and making available a likely internal pressure $p_{MC}(t)$ for a master brake cylinder (in a master brake cylinder of a braking system that cooperates with device 16). Optionally, rate of pressure change $dp_{MC}/dt$ already mentioned above may also be determined and made available by the electronic device of device 16. At least likely internal pressure $p_{MC}(t)$ for a master brake cylinder may be determined taking into account at least one provided, estimated and/or measured first variable s1 with regard to a displacement path s of a brake input element configured on master brake cylinder from initial position thereof, a provided, estimated and/or measured second variable s2 with regard to a first hydraulic fluid volumetric flow rate $q_{MC1}$ of a hydraulic fluid of the braking system out of or into a first pressure chamber of the master brake cylinder, and a provided, estimated and/or measured third variable s3 with regard to a second hydraulic fluid volumetric flow rate $q_{MC2}$ of the hydraulic fluid out of or into a second pressure chamber of the master brake cylinder. The variables and equations indicated above may be used for that purpose, for example.

In the specific embodiment of FIG. 3a, device 16 is a subunit of an ESP control 18, respectively is integrated in ESP control 18. Second variable s2 and third variable s3 may be measured and/or estimated by ESP control 18 itself. An electromechanical brake booster 20, which subsequently outputs first variable s1 to ESP control 18, may be used for measuring and/or estimating first variable 81. A device 16, as a subunit of ESP control 18, determining likely internal pressure $p_{MC}(t)$ for a master brake cylinder, is associated with the advantage that there is no need here for any complex data transmission to ESP control 18 to provide an output signal s4 indicating likely internal pressure $p_{MC}(t)$ for a master brake cylinder. Moreover, the need is also eliminated in this case for an additional time delay because of such a data transmission.

A transmission time of 100 ms may be necessary, for example, for a data transmission from an external unit to ESP control 18. Thus, in the case of a pressure gradient of the admission pressure of 1000 bar/s, the admission pressure already changes by 100 bar during the data transmission from an external unit to ESP control 18. On the other hand, it may merely take 20 ms for device 16 integrated in the ESP control to determine/make available likely internal pressure $p_M(t)$ for a master brake cylinder. Thus, in the case of the exemplary pressure gradient of the admission pressure of 1000 bar/s, the admission pressure may only deviate by 20 bar from the determined, probable internal pressure $p_{MC}(t)$ for a master brake cylinder.

Thus, likely internal pressure $p_{MC}(t)$ for a master brake cylinder provided by output signal s4 during the taking into account thereof by ESP control 18 corresponds still relatively accurately to the currently prevailing internal pressure for a master brake cylinder, for example, for controlling at least one wheel inlet valve. Thus, the operation of ESP control 18 is advantageously adapted to the currently prevailing internal pressure for a master brake cylinder. Optionally, output signal s4 indicating at least likely internal pressure for a master brake cylinder $p_{MC}(t)$ may also be output by ESP control 18 to electromechanical brake booster 20. Electromechanical brake booster 20 may also reliably adapt the method of functioning thereof to the currently prevailing internal pressure for a master brake cylinder, as described below.

In the specific embodiment of FIG. 3b, device 16 is a subunit of electromechanical brake booster 20, respectively is integrated in a control of electromechanical brake booster 20. Electromechanical brake booster 20 may be used for measuring and/or estimating first variable s1. Second variable s2 and third variable s3 may be measured and/or estimated by ESP control 18 and subsequently output to electromechanical brake booster 20. Electromechanical brake booster 20 may use/take into account likely internal pressure $p_{MC}(t)$ for a master brake cylinder already immediately after the determination because likely internal pressure $p_{MC}(t)$ for a master brake cylinder is determined by device 16 as a subunit of electromechanical brake booster 20. The need is also eliminated here for a complex data transmission to provide output signal s4, indicating likely internal pressure for a master brake cylinder $p_{MC}(t)$, to electromechanical brake booster 20. Thus, there is also no need to take into account any time delay inherent in such a data transmission when electromechanical brake booster 20 uses/takes into account likely internal pressure $p_{MC}(t)$ for a master brake cylinder. Thus, there is no need to compensate for a signal propagation time. In this case as well, output signal s4 indicating at least likely internal pressure $p_{MC}(t)$ for a master brake cylinder may also be output by electromechanical brake booster 20 to ESP control 18.

In the specific embodiment of FIG. 3c, a device 16 is integrated in each case in ESP control 18 and in electromechanical brake booster 20. The two devices 16 may be configured to communicate/exchange data with one another.

It is noted, however, that the above described integration of device 16 in ESP control 18 and/or in electromechanical brake booster 20 is merely to be interpreted exemplarily. Device 16 may also be configured as a separate component in a braking system.

Figure 4A:
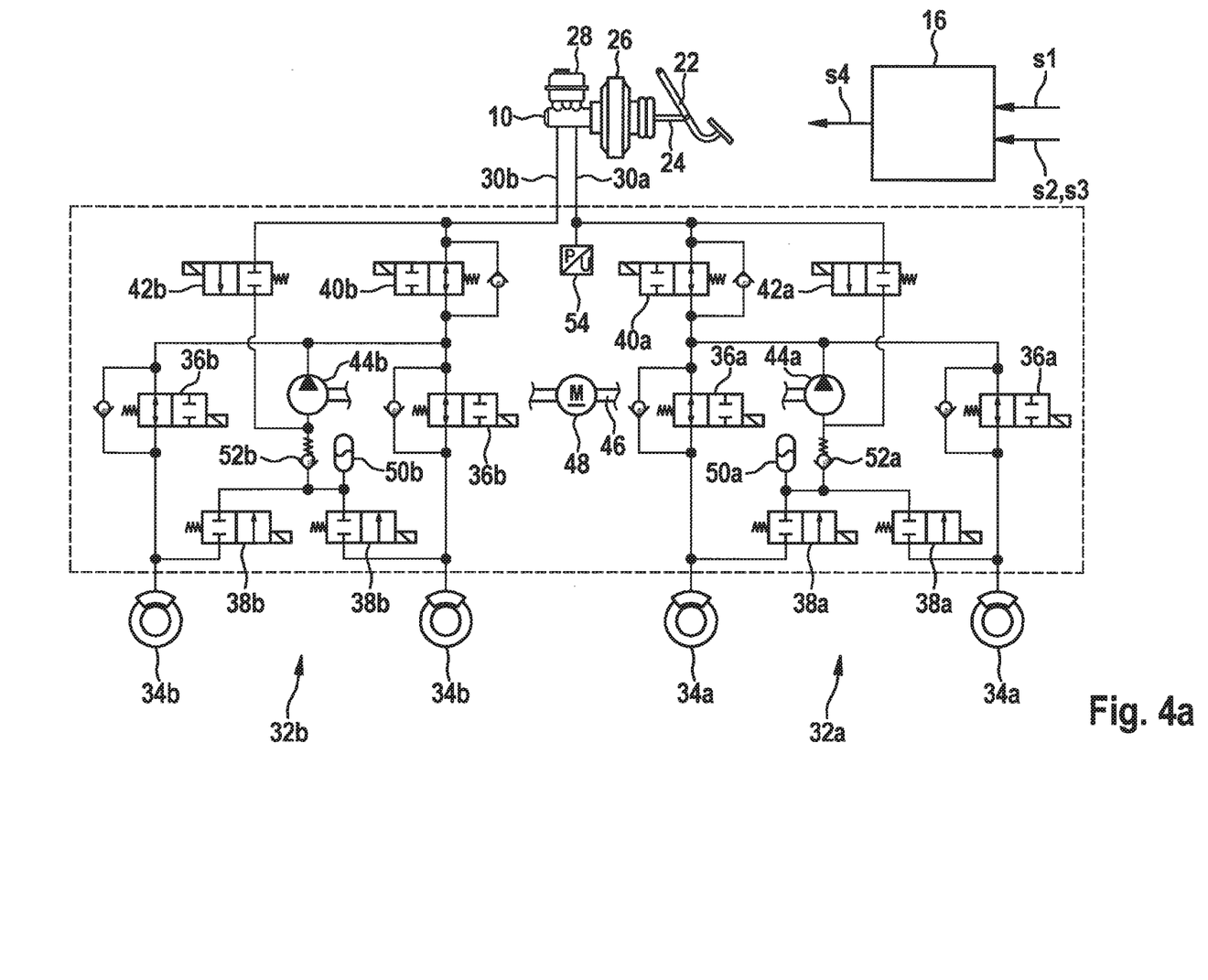
FIGS. 4a and 4b show a schematic representation of a first specific embodiment of the braking system, and a coordinate system for clarifying the method of functioning thereof.
Figure 4B:
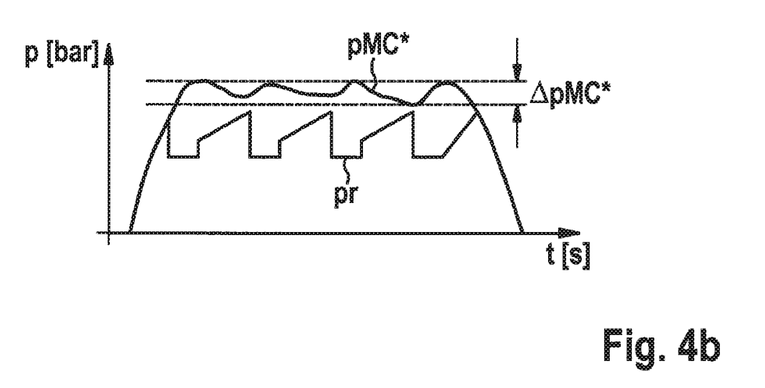

FIGS. 4a and 4b show a schematic representation of a first specific embodiment of the braking system, and a coordinate system for clarifying the method of functioning thereof.

The braking system schematically illustrated in FIG. 4a is equipped with a master brake cylinder 10, an ESP control (not shown), and device 16. A brake pedal 22 is connected via at least one input rod 24 to master brake cylinder 10. A sensor (not shown), such as an actuating travel sensor and/or a rod displacement sensor, may be optionally mounted on brake pedal 22. Configured, moreover, between brake pedal 22 and master brake cylinder 10 is a vacuum brake booster 26. A brake-medium reservoir 28 for providing a hydraulic fluid also communicates with master brake cylinder 10. Brake medium reservoir 28 may communicate via at least one breather port with master brake cylinder 10.

Master brake cylinder 14 includes two (not visible) pressure chambers, which communicate fluidically/hydraulically in each case via a supply line 30a and 30b with one brake circuit 32a and 32b each. Each of brake circuits 32a and 32b has two wheel brake cylinders 34a and 34b (which may be hydraulically actuatable disk brake devices). Brake circuits 32a and 32b may be optionally used for an X brake circuit scheme or for a II brake circuit scheme.

Associated with each wheel brake cylinder 34a and 34b is one wheel inlet valve 36a and 36b (having a nonreturn valve configured in a bypass line). Similarly associated with each wheel brake cylinder 34a and 34b is a wheel outlet valve 38a and 38b, respectively. Moreover, each of brake circuits 32a and 32b has a switchover valve 40a and 40b (having a nonreturn valve configured in a bypass line), a high-pressure switching valve 42a and 42b, and a return pump 44a and 44b, the two return pumps 44a and 44b being mountable on a common shaft 46 of a motor 48. One accumulator chamber 50a and 50b each, which may be a low-pressure accumulator chamber 50a and 50b, communicates on the output side with both wheel outlet valves 38a and 38b of a brake circuit 32a and 32b. A pressure relief valve 52a and 52b may be configured in each case between an accumulator chamber 50a and 50b and return pump 44a and 44b of same brake circuit 32a and 32b. Optionally, the braking system still has at least one pressure sensor, such as an admission pressure sensor 54, for example.

During an ABS control, hydraulic fluid (respectively brake fluid) may be removed by wheel outlet valves 38a and 38b from at least one wheel brake cylinder 34a and 34b into accumulator chambers 50a and 50b. The hydraulic fluid may subsequently be returned from accumulator chambers 50a and 50b into master brake cylinder 10 by return pumps 44a and 44b. This makes it possible to compensate for a brake fluid consumption during an ABS control. Thus, an ABS control without any time limits is possible.

The coordinate system of FIG. 4b shows the pressure modulation that commonly occurs during the return flows in master brake cylinder 10, an abscissa of the coordinate system of FIG. 4b indicating time axis t (in seconds), and an ordinate of the coordinate system of FIG. 4b, a pressure p (in bar). Graph $p_r$ shows the pressure profile (brake pressure profile) produced by the ABS/ESP system in a wheel brake cylinder 34a and 34b. Graph $p_{MC}$* shows a pressure profile that commonly occurs during the return flows in master brake cylinder 10. Discernible are pressure fluctuations $\Delta p_{MC}$* that may commonly occur during the return flows in master brake cylinder 10.

However, using device 16, the likely present internal pressure for master brake cylinder may be quickly and reliably determined even during the return flows in master brake cylinder 10. The advantage may be thereby utilized, in particular, that variables s2 and s3, respectively data pertaining to first hydraulic fluid volumetric flow rate $q_{MC1}$ and second hydraulic fluid volumetric flow rate $q_{MC2}$ are generally already present in the ESP control, even during the return flows. For that reason, at least the ESP control that cooperates/is equipped with device 16 may react relatively quickly and reliably to pressure fluctuations $\Delta p_{MC}$ triggered in master brake cylinder 10. Especially when controlling braking system components whose setpoints are dependent on the likely internal pressure for a master brake cylinder, the ESP control that cooperates/is equipped with device 16 may take output signal s4 into account. For example, output signal s4 may be taken into account for a propagation time compensation and/or a delay time compensation. Output signal s4 may be taken into account, especially in the case that wheel inlet valves 36a and 36b are driven by the ESP control. ESP control may adapt the method of functioning thereof, taking output signal s4 into account, in particular, to minimize pressure fluctuations $\Delta p_{MC}$ that occur during the return flows in master brake cylinder 10.

Figure 5A:
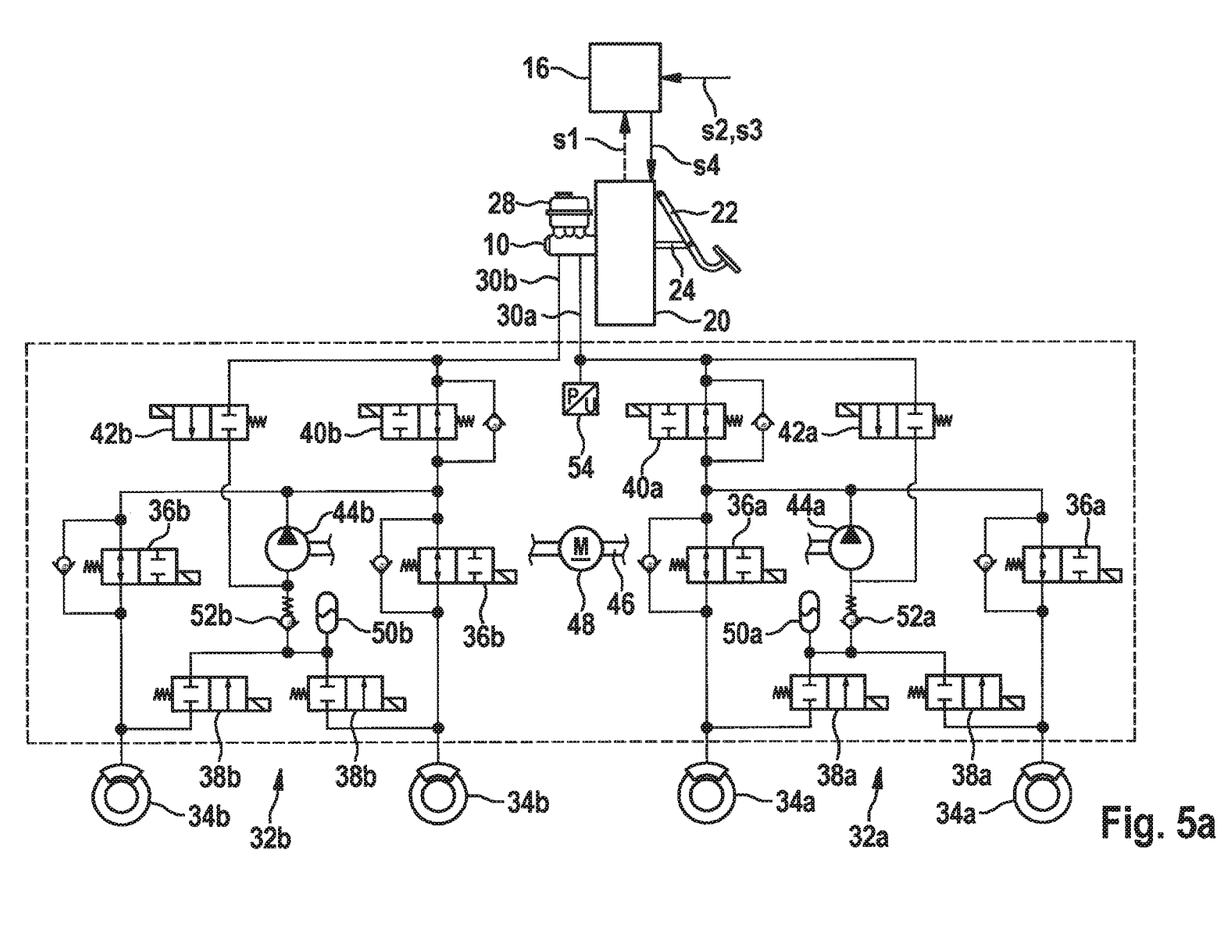
FIGS. 5a and 5b show a schematic representation of a second specific embodiment of the braking system, and a coordinate system for clarifying the functioning method thereof.
Figure 5B:
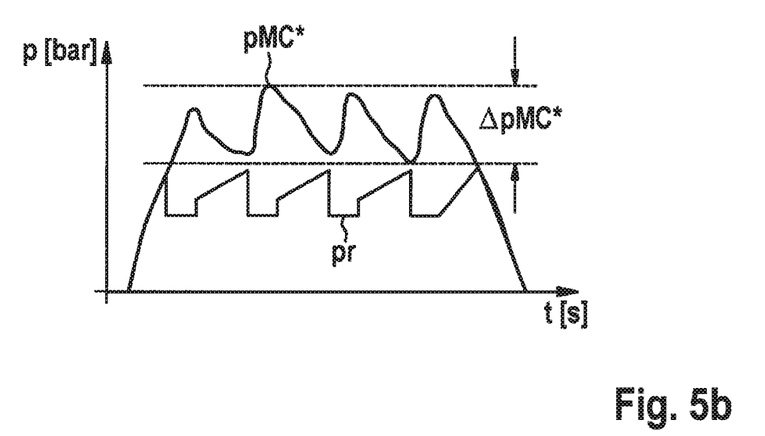

FIGS. 5a and 5b show a schematic representation of a second specific embodiment of the braking system, and a coordinate system for clarifying the method of functioning thereof.

In contrast to the above specific embodiment, the braking system schematically illustrated in FIG. 5a has an electromechanical brake booster 20. The feasibility of electromechanical brake booster 20 is not limited to a specific brake booster type. With regard to the further components of the braking system of FIG. 5a, reference is made to the preceding paragraphs.

The coordinate system of FIG. 5b shows the pressure modulation that commonly occurs during the return flows in master brake cylinder 10 in the case of such a braking system, an abscissa of the coordinate system of FIG. 5b being time axis t (in seconds), and an ordinate of coordinate system of FIG. 4b indicating a pressure p (in bar). Again, graph $p_r$ indicates the pressure profile (brake pressure profile) produced by the ABS/ESP system in a wheel brake cylinder 34a and 34b, and a graph $p_{MC}^*$, a pressure profile that commonly occurs during the return flows in master brake cylinder 10.

Although graph $p_r$ of the coordinate system of FIG. 5b is identical to the corresponding graphs of FIG. 4b, significantly greater pressure fluctuations $\Delta_{MC}^*$ commonly occur during the return flows in a master brake cylinder 10 of a braking system equipped with an electromechanical brake booster 20. This is due to the decoupling of brake pedal 22/of the driver's foot from the master brake cylinder carried out by electromechanical brake booster 20.

Therefore, a return flow of hydraulic fluid is not intercepted, respectively compensated by a force applied by the driver (i.e., by the driver's foot). Thus, a braking system equipped with an electromechanical brake booster 20 generally has lower total elasticity. Provided that pressure fluctuations $\Delta p_{MC}^*$ in master brake cylinder 10 are not counteracted during the return flow of hydraulic fluid (by pumps 44a and 44b), the occurrence thereof may commonly be more intense in a braking system equipped with an electromechanical brake booster 20.

In the braking system of FIG. 5b, however, the ESP control (not shown) and/or electromechanical brake booster 20 may cooperate with device 16. In particular, the ESP control and/or electromechanical brake booster 20 may be equipped with device 16. In addition to the ESP control advantageously taking already described output signal s4 into account, electromechanical brake booster 20 may also be adapted in the method of functioning thereof to the likely internal pressure for a master brake cylinder defined by the device. In particular, because of the comparatively rapid determinability/definability of the likely internal pressure for a master brake cylinder, electromechanical brake booster 20 may be selectively driven/precontrolled in a way that allows the booster force exerted by electromechanical brake booster 20 on the pistons of master brake cylinder 10 to be reduced in the case of a (predicted) pressure maximum. Particularly when a relatively large quantity of hydraulic fluid flows into master brake cylinder 10, the booster force may thus be canceled. Accordingly, also by selectively precontrolling electromechanical brake booster 20, the booster force thereof may be increased in the case of a (predicted) pressure minimum. In this case, electromechanical brake booster 20 may react with an increased booster force to a relatively low flow of hydraulic fluid into master brake cylinder 10.

In summary, the pressure modulations in master brake cylinder 10 may be attenuated/suppressed, in particular due to a cooperation of the ESP control and electromechanical booster 20. This makes it possible for many braking system components to be protected from an increased mechanical load caused by pressure modulations in master brake cylinder 10. Therefore, by using advantageous device 16 in the braking system, the performance reliability and the service life of many braking system components may be enhanced.

What is claimed is:

1. A method for determining a likely internal pressure for a master brake cylinder, the method comprising:
    at least one of estimating or measuring a displacement path(s) of a brake input element on a master brake cylinder from an initial position thereof;
    at least one of estimating or measuring a first hydraulic fluid volumetric flow rate of a hydraulic fluid of the braking system out of or into a first pressure chamber of the master brake cylinder, and a second hydraulic fluid volumetric flow rate of the hydraulic fluid out of or into a second pressure chamber of the master brake cylinder;
    determining the likely internal pressure for a master brake cylinder at least taking into account the estimated or measured displacement path(s), the estimated or measured first hydraulic fluid volumetric flow rate, and the estimated or measured second hydraulic fluid volumetric flow rate; and
    controlling at least one braking system component based on the determined likely internal pressure for the master brake cylinder.

2. The method of claim 1, wherein the likely internal pressure for a master brake cylinder is determined while additionally taking into account at least one of: at least one measured master brake cylinder pressure value, or at least one measured admission pressure.

3. The method of claim 1, wherein the likely internal pressure for a master brake cylinder is determined while additionally taking into account at least one of: a compression module of the hydraulic fluid, an output volume of the master brake cylinder when the brake input element is in the initial position thereof, an inner diameter of the master brake cylinder, or a cross-sectional area of the master brake cylinder.

4. The method of claim 3, wherein to determine the likely internal pressure for a master brake cylinder, a rate of pressure change is continuously determined where:

$$\frac{dp_{MC}}{dt} = \frac{k}{V_0 - \pi \cdot \frac{d^2}{4} \cdot s} \cdot \left( q_{MC1} + q_{MC2} + \pi \cdot \frac{d^2}{4} \cdot \frac{ds}{dt} \right),$$

$dp_{MC}/dt$ being the rate of pressure change, K being a compression module of the hydraulic fluid, $V_0$ being an output volume of the master brake cylinder, d being an inner diameter of the master brake cylinder, $q_{MC1}$ being the first hydraulic fluid volumetric flow rate, $q_{MC2}$ being the second hydraulic fluid volumetric flow rate, s being the displacement path(s), and ds/dt being an estimated or measured rate of change of displacement path(s) of brake input element and/or an estimated or measured adjustment speed of the brake input element.

5. The method of claim 3, wherein to determine the likely internal pressure for a master brake cylinder, the rate of pressure change is continuously determined where:

$$\frac{dp_{MC}}{dt} = \frac{k}{V_0 - A \cdot s} \cdot \left(q_{MC1} + q_{MC2} + A \cdot \frac{ds}{dt}\right),$$

$dp_{MC}/dt$ being the rate of pressure change, K being a compression module of the hydraulic fluid, $V_0$ being an output volume of the master brake cylinder, A being a cross-sectional area of the master brake cylinder, $q_{MC1}$ being the first hydraulic fluid volumetric flow rate, $q_{MC2}$ being the second hydraulic fluid volumetric flow rate, s being the displacement path(s), and ds/dt being the estimated or measured rate of change of the displacement path(s) of the brake input element and/or the estimated or measured adjustment speed of the brake input element.

6. The method of claim 4, wherein the likely internal pressure for a master brake cylinder is determined as the integral over the rate of pressure change where:

$$p_{MC}(t) = p_{MC}(t_0) + \int_{t_0}^{t} \frac{dp_{MC}}{dt} \cdot dt,$$

$p_{MC}(t)$ being the likely internal pressure for the master brake cylinder, $P_{MC}(t0)$ being an output value or a value ascertained for the point in time t0, and $dp_{MC}/dt$ being a rate of change of the likely internal pressure.

7. The method of claim 4, wherein the likely internal pressure for a master brake cylinder is determined over the rate of pressure change where:

$$p_{MC}(t) = p_{MC}*(t') + \frac{dp_{MC}}{dt} \cdot (t - t'),$$

$p_{MC}(t)$ being the likely internal pressure for the master brake cylinder, $p_{MC}*(t')$ being a master brake cylinder pressure value measured at time t', an admission pressure measured at time t', or a likely internal pressure $p_{MC}(t')$ for a master brake cylinder determined for time t', and $dp_{MC}/dt$ being a rate of change of the likely internal pressure.

8. The method of claim 1, wherein the displacement paths are measured or estimated using at least one subunit of an electromechanical brake booster.

9. The method of claim 1, wherein at least one of the first hydraulic fluid volumetric flow rate or the second hydraulic fluid volumetric flow rate is measured or estimated by at least one subunit of an electronic stability program (ESP) control electronics.

10. A device for determining a likely internal pressure for a master brake cylinder, comprising:
an electronic device to determine and make available the likely internal pressure of the master brake cylinder, taking into account:
at least one provided, estimated or measured first variable with respect to a displacement path(s) of a brake input element on a master brake cylinder of a braking system from the initial position thereof,
at least one provided, estimated or measured second variable with respect to a first hydraulic fluid volumetric flow of a hydraulic fluid of the braking system out of or into a first pressure chamber of the master brake cylinder, and
at least one provided, estimated or measured third variable with respect to a second hydraulic fluid volumetric flow of the hydraulic fluid out of or into a second pressure chamber of the master brake cylinder; and
an electronic device to control at least one braking system component based on the determined likely internal pressure for the master brake cylinder.

11. An electromechanical brake booster, comprising:
a device for determining a likely internal pressure for a master brake cylinder, including:
an electronic device to determine and make available the likely internal pressure of the master brake cylinder, taking into account:
at least one provided, estimated or measured first variable with respect to a displacement path(s) of a brake input element on a master brake cylinder of a braking system from the initial position thereof,
at least one provided, estimated or measured second variable with respect to a first hydraulic fluid volumetric flow of a hydraulic fluid of the braking system out of or into a first pressure chamber of the master brake cylinder, and
at least one provided, estimated or measured third variable with respect to a second hydraulic fluid volumetric flow of the hydraulic fluid out of or into a second pressure chamber of the master brake cylinder.

12. An electronic stability program (ESP) controller, comprising:
a device for determining a likely internal pressure for a master brake cylinder, including:
an electronic device to determine and make available the likely internal pressure of the master brake cylinder, taking into account:
at least one provided, estimated or measured first variable with respect to a displacement path(s) of a brake input element on a master brake cylinder of a braking system from the initial position thereof,
at least one provided, estimated or measured second variable with respect to a first hydraulic fluid volumetric flow of a hydraulic fluid of the braking system out of or into a first pressure chamber of the master brake cylinder, and
at least one provided, estimated or measured third variable with respect to a second hydraulic fluid volumetric flow of the hydraulic fluid out of or into a second pressure chamber of the master brake cylinder.

13. A braking system for a motor vehicle, comprising:
at least one of an arrangement, an electromechanical brake booster, or and an electronic stability program (ESP) controller; wherein each includes a device for determining a likely internal pressure for a master brake cylinder, the device including:
an electronic device to determine and make available the likely internal pressure of the master brake cylinder, taking into account:
at least one provided, estimated or measured first variable with respect to a displacement path(s) of a brake input element on a master brake cylinder of a braking system from the initial position thereof,
at least one provided, estimated or measured second variable with respect to a first hydraulic fluid volumetric flow of a hydraulic fluid of the braking system out of or into a first pressure chamber of the master brake cylinder, and at least one provided, estimated or measured third variable with respect to a second hydraulic fluid volumetric flow of the hydraulic fluid out of or into a second pressure chamber of the master brake cylinder.

\* \* \* \* \*